(12) United States Patent
Mihara

(10) Patent No.: US 9,864,736 B2
(45) Date of Patent: Jan. 9, 2018

(54) INFORMATION PROCESSING APPARATUS, CONTROL METHOD, AND RECORDING MEDIUM

(71) Applicant: CANON KABUSHIKI KAISHA, Tokyo (JP)

(72) Inventor: Makoto Mihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 457 days.

(21) Appl. No.: 14/021,509

(22) Filed: Sep. 9, 2013

(65) Prior Publication Data
US 2014/0075301 A1 Mar. 13, 2014

(30) Foreign Application Priority Data

Sep. 11, 2012 (JP) ................................. 2012-199484

(51) Int. Cl.
*G06F 17/00* (2006.01)
*G06F 17/24* (2006.01)
(52) U.S. Cl.
CPC .................................. *G06F 17/24* (2013.01)
(58) Field of Classification Search
CPC ....................................................... G06F 17/24
USPC .................................................. 715/201, 255
See application file for complete search history.

(56) References Cited

U.S. PATENT DOCUMENTS

| 2007/0099162 | A1* | 5/2007 | Sekhar | 434/323 |
| 2007/0271502 | A1* | 11/2007 | Bedi et al. | 715/512 |
| 2008/0244419 | A1* | 10/2008 | Kurpick et al. | 715/756 |
| 2011/0099549 | A1* | 4/2011 | Sriraghavan | G06Q 10/101 718/100 |
| 2011/0252339 | A1* | 10/2011 | Lemonik et al. | 715/753 |
| 2013/0283147 | A1* | 10/2013 | Wong et al. | 715/234 |
| 2013/0326344 | A1* | 12/2013 | Masselle et al. | 715/255 |

FOREIGN PATENT DOCUMENTS

JP        P2001-60179 A       3/2001

* cited by examiner

*Primary Examiner* — Stephen Hong
*Assistant Examiner* — Matthew Ludwig
(74) *Attorney, Agent, or Firm* — Canon U.S.A., Inc. IP Division

(57) ABSTRACT

An information processing apparatus and a control method update document data in such a manner that an object in document data is inputted to an application, the object is transmitted to an external information processing apparatus, a processing result processed based on the object is received, and the processing result is inputted to the document data.

13 Claims, 22 Drawing Sheets

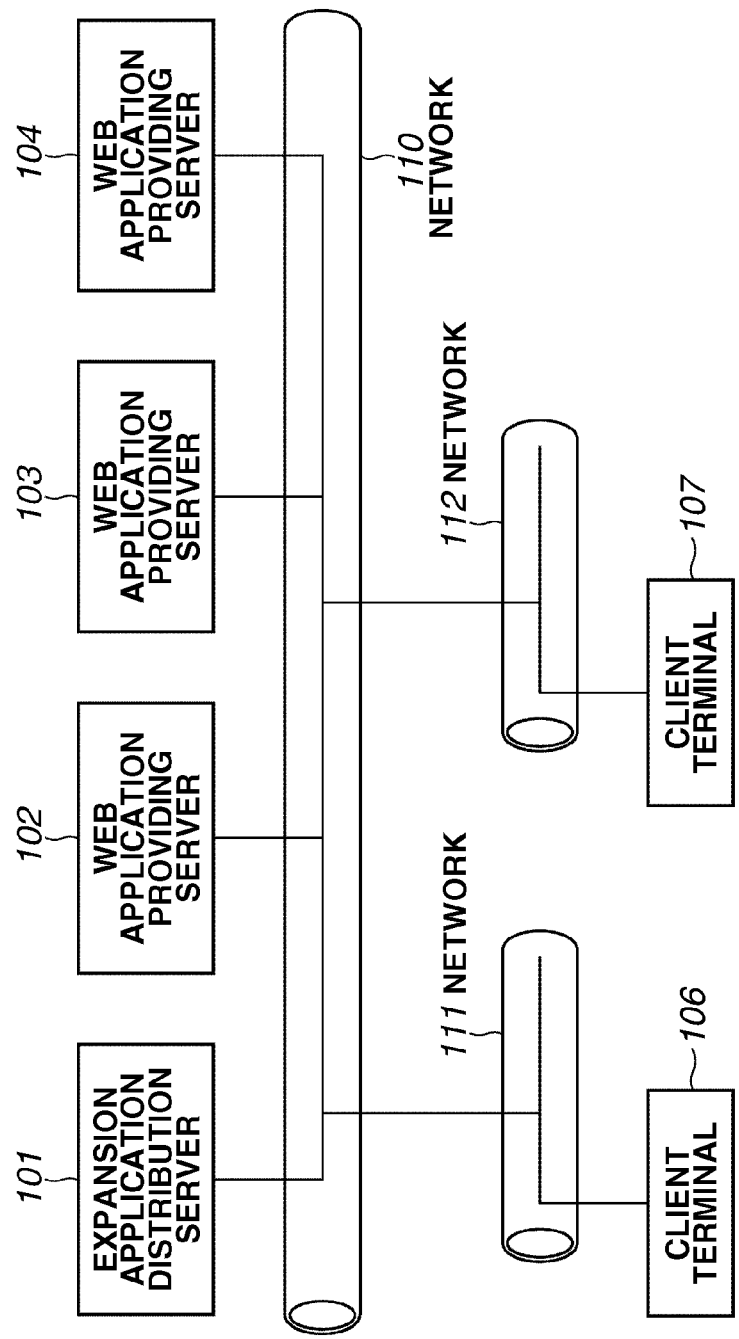

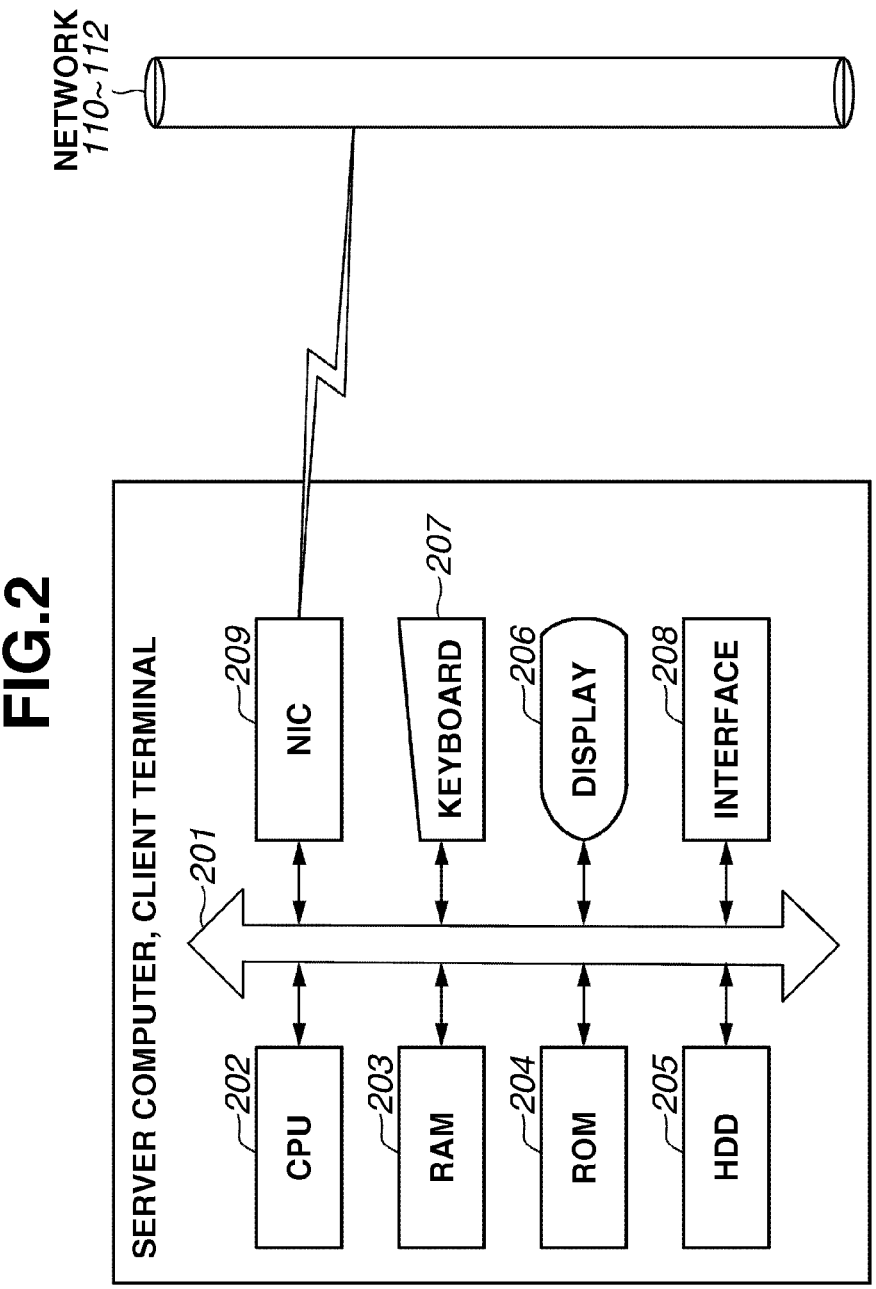

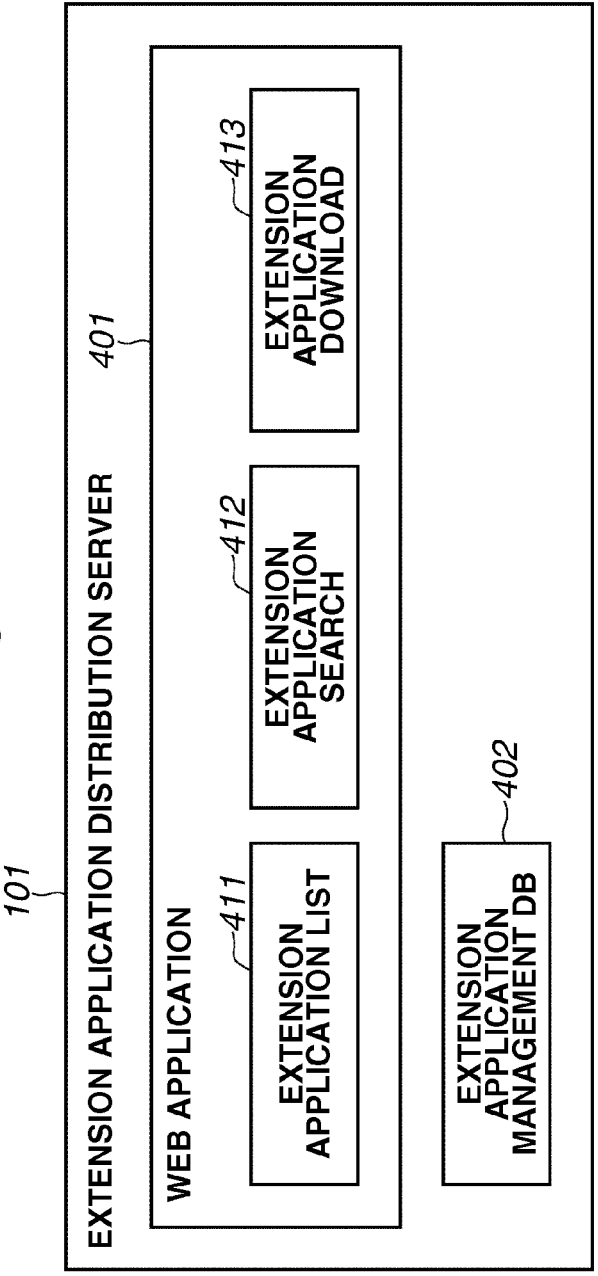

FIG.5

| EXTENSION APPLICATION ID | NAME | LOCATION | PROVIDER | DESCRIPTION |
|---|---|---|---|---|
| ABCD1234 | COUNT | http://www.test.com/main.aspx | A CORP. | COUNT XX |
| EFGH5678 | Hoge Hello | http://www.hoge.com/hello.html | B INC. | PERFORM YY |
| HIJL9012 | Test | http://www.aaa.co.jp/aaa.do | C INC. | PERFORM XX |

<ExtensionAppData>
  <AppID>ABCD1234</ABCD>        ⎫ 1002
  <Edit>
    <In>                        ⎫
      <Doc>ObjectA</Doc>        ⎪
      <App>Input1</App>         ⎬ 1003
      <Status>OK</Status>       ⎪
    </In>                       ⎭
    <In>                        ⎫
      <Doc>ObjectB</Doc>        ⎪
      <App>Input2</App>         ⎬ 1004
      <Status>OK</Status>       ⎪
    </In>                       ⎭
    <Out>                       ⎫
      <Doc>ObjectC</Doc>        ⎪
      <App>Output1</App>        ⎬ 1005
      <Status>OK</Status>       ⎪
    </Out>                      ⎭
  </Edit>
  <Substitute>                  ⎫
    <Position>                  ⎪
      <Page>1</Page>            ⎪
      <X>450</X>                ⎪
      <Y>500</Y>                ⎬ 1006
    </Position>                 ⎪
    <Data>AZAZagh4a4hy490386n5v98... </Data>
  </Substitute>                 ⎭
</ExtensionAppData>
```

DOWNLOAD CONFIRMATION

THE FOLLOWING EXTENSION APPLICATION IS USED IN THIS DOCUMENT. IS IT ALL RIGHT TO MAKE A CONNECTION WITH A MARKET PLACE AND INSTALL IN YOUR ENVIRONMENT?

NAME: COUNT
PROVIDER: A CORP.
DESCRIPTION: COUNT XX

YES   NO

```
<?xml version="1.0" encoding="UTF-8"?>
<Extension>
 <ID>ABCD1234</ID>
 <Name>COUNT</Name>
 <Prvider>A CORP.</Provider>
 <Desctiption>COUNT XX</Description>
 <Location>http://www.test.com/main.aspx</Location>
</Extension>
```

FIG.17A

```
<Edit>
  <In>
    <Doc>ObjectA</Doc>
    <App>Input1</App>         ⎫ 1701
    <Status>OK</Status>
  </In>
  <In>
    <Doc>ObjectB</Doc>
    <App>Input2</App>          ⎫ 1702
    <Status>Edit</Status>
  </In>
  <Out>
    <Doc>ObjectC</Doc>
    <App>Output1</App>         ⎫ 1703
    <Status>Warning</Status>
  </Out>
</Edit>
```

FIG.17B

```
<Edit>
  <In>
    <Doc>ObjectA</Doc>
    <App>Input1</App>          ⎫ 1711
    <Status>OK</Status>
  </In>
  <In>
    <Doc>ObjectB</Doc>
    <App>Input2</App>          ⎫ 1712
    <Status>Delete</Status>
  </In>
  <Out>
    <Doc>ObjectC</Doc>
    <App>Output1</App>         ⎫ 1713
    <Status>Error</Status>
  </Out>
</Edit>
```

FIG.17C

```
<Edit>
  <In>
    <Doc>ObjectA</Doc>
    <App>Input1</App>          ⎫ 1721
    <Status>Warning</Status>
  </In>
  <In>
    <Doc>ObjectB</Doc>
    <App>Input2</App>          ⎫ 1722
    <Status>Warning</Status>
  </In>
  <Out>
    <Doc>ObjectC</Doc>
    <App>Output1</App>         ⎫ 1723
    <Status>Edit</Status>
  </Out>
</Edit>
```

FIG.17D

```
<Edit>
  <In>
    <Doc>ObjectA</Doc>
    <App>Input1</App>          ⎫ 1731
    <Status>Error</Status>
  </In>
  <In>
    <Doc>ObjectB</Doc>
    <App>Input2</App>          ⎫ 1732
    <Status>Error</Status>
  </In>
  <Out>
    <Doc>ObjectC</Doc>
    <App>Output1</App>         ⎫ 1733
    <Status>Delete</Status>
  </Out>
</Edit>
```

INFORMATION PROCESSING APPARATUS, CONTROL METHOD, AND RECORDING MEDIUM

BACKGROUND OF THE INVENTION

Field of the Invention

The present invention relates to a technique for generating document data.

Description of the Related Art

Japanese Laid-Open Patent Application No. 2001-60179 discusses a history recording apparatus that records the contents of a form input to a site on a web browser screen and issues a uniform resource locator (URL) for the record of contents of the form. A user can restore input contents of the form by accessing the issued URL.

The following two different environments are presumed. In a first environment, document data is generated and an external information processing apparatus processes the document data based on an object of the generated document data and updates them based on the processing result. In a second environment, the document data generated in the first environment can be edited, but cannot be updated based on the processing result unlike in the first environment.

However, Japanese Laid-Open Patent Application No. 2001-60179 discusses nothing about both of the two different presumed environments.

Therefore, under the assumption of the presumed environments, if the document data edited in the second environment is opened again in the first environment, editing of the second environment cannot be detected in the first environment, so that the document data may be unable to be updated.

SUMMARY OF THE INVENTION

The present invention is directed to an information processing apparatus, a control method, and a recording medium capable of updating document data in a first environment in collaboration with an external information processing apparatus in consideration of editing in a second environment.

According to an aspect of the present invention, an information processing apparatus includes an input unit configured to input an input object in document data to an application as editing information, a reception unit configured to receive a processing result processed based on the editing information input by the input unit by transmitting to an external information processing apparatus the editing information input by the input unit, an update unit configured to update the document data by displaying the processing result received by the reception unit in an area of the application of the document data when the application is activated, a storage unit configured to store a display content of the application of the document data as an image, and a display unit configured to display in the area of the application of the document data the image stored in the storage unit when the application is not activated.

Further features of the present invention will become apparent from the following detailed description of exemplary embodiments with reference to the attached drawings.

BRIEF DESCRIPTION OF THE DRAWINGS

FIG. 1 is a block diagram illustrating an overall configuration of an application extension platform according to an exemplary embodiment of the present invention.

FIG. 2 is a block diagram illustrating a hardware configuration of a computer that can execute an extension application distribution server, web application providing servers, and client terminals.

FIG. 4 is a block diagram illustrating a system configuration of the extension application distribution server.

FIG. 5 is a table illustrating an example of extension application management data stored in the extension application distribution server.

FIG. 10 is an example of data actually recorded by the processing in FIG. 9.

FIG. 13 is an example of definition information of the extension application.

FIGS. 17A, 17B, 17C, and 17D illustrate examples in a case where a mismatch state is recorded in the extension application editing information.

DESCRIPTION OF THE EMBODIMENTS

Figure 3A:
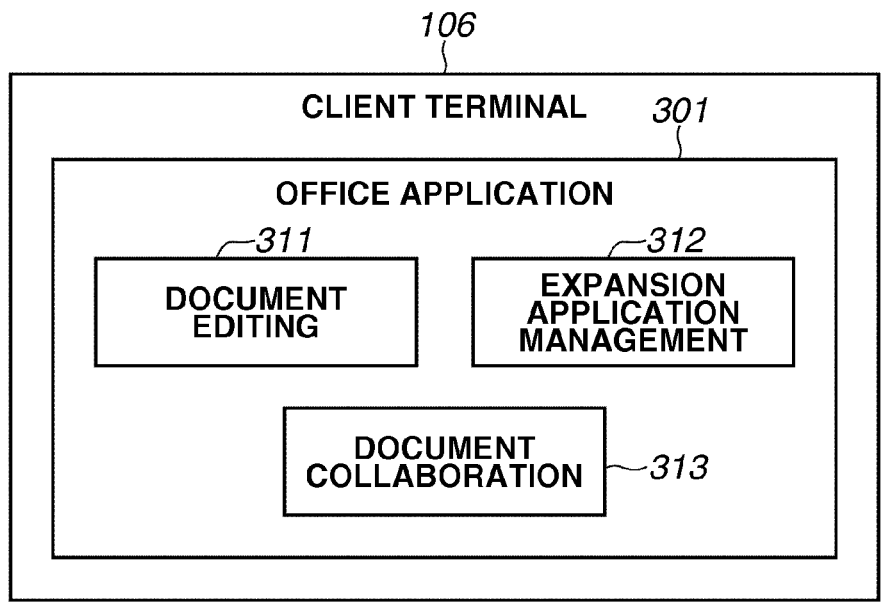
FIGS. 3A and 3B are block diagrams illustrating a system configuration of the client terminals.

FIG. 1 is a block diagram illustrating an overall configuration of an application extension platform according to an exemplary embodiment of the present invention.

In FIG. 1, an extension application distribution server 101, web application providing servers 102, 103, and 104, client terminals 106 and 107 are connected to one another via networks 110 to 112. In FIG. 1, it is presumed that a plurality of the web application providing servers 102, 103, and 104, and the client terminals 106 and 107 are connected. The networks 110 to 112 are any of a local area network and a wide area network (WAN) such as the Internet, a telephone circuit, and a dedicated digital line, for example, or a so-called communication network realized by combining the above networks. The networks 110 to 112 have only a function for transmitting and receiving data. In general, the network 110 is the Internet, and the networks 111 and 112 are a network in an office or a network of a service provider. The client terminals 106 and 107 are a desktop personal computer, a note personal computer, a mobile personal computer, and a tablet terminal, but may be a smart phone if it is provided with an execution environment of an office application 301 described below. The client terminals 106 and 107 incorporate environment for executing programs such as an office application and a web browser.

FIG. 2 is a block diagram illustrating a hardware configuration of a computer that can execute the extension application distribution server 101, the web application providing servers (external information processing apparatuses) 102, 103, and 104, and the client terminals 106 and 107.

In FIG. 2, a central processing unit (CPU) 202 controls the entire apparatus. The CPU 202 executes an application program and an operating system (OS) stored in a hard disk drive (HDD) 205 and performs control for temporarily storing information and a file required for executing the program in a random access memory (RAM) 203. A read only memory (ROM) 204 is a storage unit, and stores various data such as a basic input/output (I/O) program therein. The RAM 203 is a temporary storage unit, and functions as a main memory and a work area of the CPU 202. The HDD 205 is one of external storage units, functions as a large capacity memory, and stores application programs such as the office application and the web browser, the OS, and related programs. A display 206 is a display unit for displaying commands input from a keyboard 207. An interface 208 is an external device interface (I/F) for connecting a printer, a universal serial bus (USB) device, and a peripheral device. The keyboard 207 is an instruction input unit. A system bus 201 controls a flow of data in the apparatus. A network interface card (NIC) 209 exchanges data with an external device via the interface 209 to the networks 110 to 112. The configuration of the computer is an example and not limited to the example the configuration illustrated in FIG. 2. For example, data and program may be stored in the ROM 204, the RAM 203, and the HDD 205 according to the characteristics thereof.

In addition, the CPU 202 executes processing based on the program stored in the external storage unit to realize the software configuration illustrated in FIGS. 3A and 3B and processing in each step of a flowchart described below.

Figure 3B:
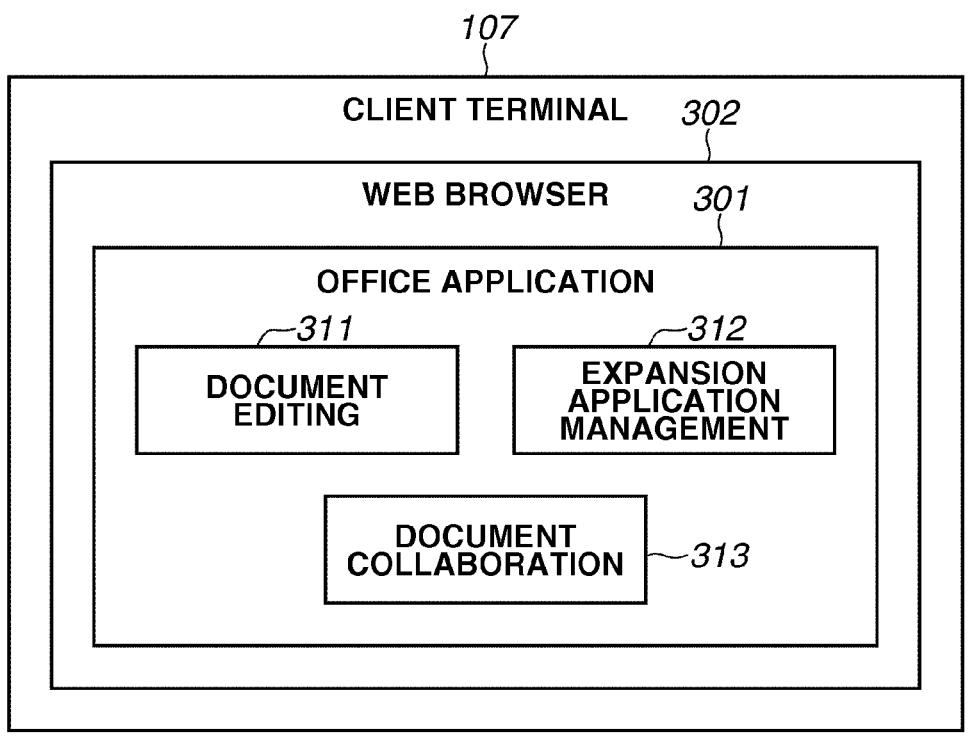

FIGS. 3A and 3B are block diagrams illustrating system configurations of the client terminals 106 and 107 according to the present exemplary embodiment of the present invention. In FIGS. 3A and 3B, the office application 301 is used to generate documents. The office application 301 includes a document editing function 311, an expansion application management function 312, and a document collaboration function 313. The expansion application management function 312 realizes the management and execution of various types of extension applications, and the document collaboration 313 realizes a collaborative operation between the extension application and the document.

As illustrated in FIG. 3A, the office application 301 is provided as an application operating on a client or, as illustrated in FIG. 3B, the office application 301 is provided as a web application operating on the web browser 302 on the client. If the office application 301 is provided as a web application, the web application providing servers 102, 103, and 104 provide functions for the office application 301.

The extension application distribution server 101, and the web application providing servers 102, 103, and 104, which realize the functions of the extension application in the office application 301, are described below.

The extension application distribution server 101 is described below with reference to FIG. 4. The extension application distribution server 101 registers and manages extension applications written by various developers. The office application 301 is connected to the extension application distribution server 101 to enable searching and acquiring various different types of extension applications.

By downloading an extension application, the user can use the selected extension application on the office application 301. The extension applications can be downloaded by downloading definition information 1301 described below.

FIG. 4 is a block diagram illustrating a system configuration of the extension application distribution server 101 according to the present exemplary embodiment of the present invention. The extension application distribution server 101 includes a web application unit 401 and an extension application management database (DB) 402. These components execute various different types of processing operations and provide a function of distributing the extension application.

The web application unit 401 is accessed by the office application 301 to provide functions such as list display, search, and download of the extension application. These functions are provided by an extension application list unit 411, an extension application search unit 412, and an extension application download unit 413, respectively.

The extension application management DB 402 stores information about the extension application.

FIG. 5 illustrates a detail of the information stored in the extension application management DB 402.

An extension application identification (ID) column 501 of the extension application management DB 402 manages IDs for uniquely identifying the extension application. A name column 502 manages the names of the extension applications. A location column 503 manages the URLs of the web applications for executing processing in response to the request of the extension application. When the extension application is started, the URL of the location column 503 is accessed to display the web application. A provider column 504 manages information about persons and organization providing the extension applications. A description column 505 manages information about description of the extension application.

The web application providing servers 102, 103, and 104 are described below with reference to FIG. 6. The web application providing servers 102, 103, and 104 provide web applications that are entity of various extension applications. The URLs defined by the above-described location column 503 refer to addresses of the web application providing servers 102, 103, and 104.

Figure 6:
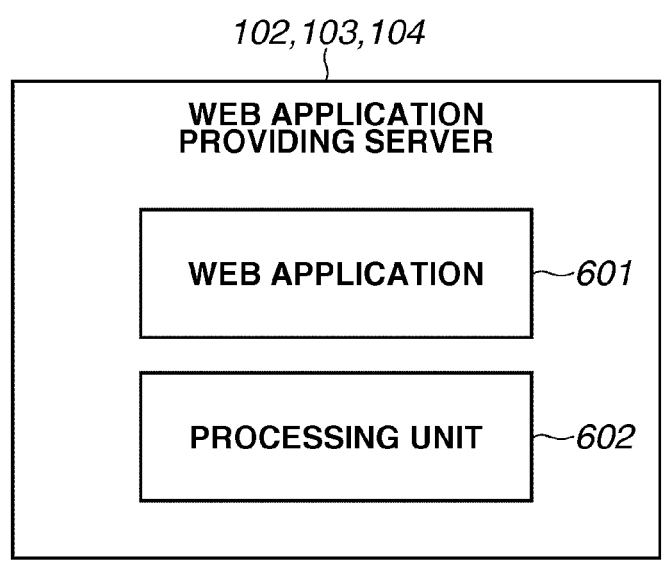
FIG. 6 is a block diagram illustrating a system configuration of the web application providing servers.

FIG. 6 is a diagram illustrating a system configuration of the web application providing servers 102, 103, and 104 according to the present exemplary embodiment.

The web application providing servers 102, 103, and 104, each include a web application unit 601 and a processing unit 602. The components execute various types of processing operations to provide the web application functions for the extension applications.

The web application unit 601 receives a request from the extension application and sends as a response the results processed by the processing unit 602.

Thus, the office application 301 allows the acquisition and execution of the extension application. The operation in a case where the extension application is operated on the office application 301 will be described.

Figure 7:
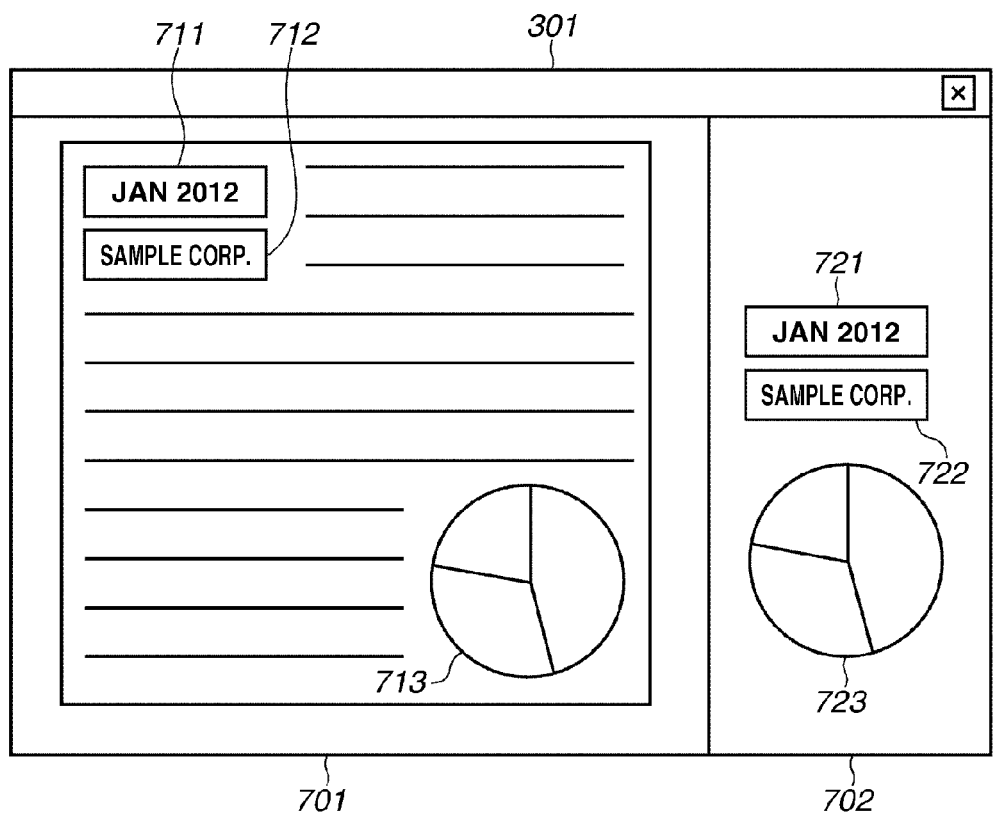
FIG. 7 illustrates an office application and an extension application according to an exemplary embodiment of the present invention.

FIG. 7 illustrates the office application 301 and the extension application according to the present exemplary embodiment.

FIG. 7 illustrates the state where the office application 301 is started by the client terminal 106, and an extension application 702 is executed. The extension application 702 is selected from the menu of the office application 301 and started. A plurality of the extension applications 702 can be started at the same time. The menu for starting the extension application displays an extension application list which can be started based on information managed by the expansion application management function 312.

FIG. 13 illustrates an example of definition information of an extension application managed by the expansion application management function 312. Definition information 1301 is used for managing and executing the extension application. More specifically, the expansion application management function 312 uses the definition information 1301 to enable identifying the extension application and starting the extension application. For the purpose of identifying and starting the extension application, the definition information 1301 includes the same values as the data managed by the extension application management DB 402.

A document 701 is document data opened by the office application 301, and provides a display and an editing function. In the present exemplary embodiment, the extension application 702 is executed as a task pane (a display area on the office application 301) in the office application 301. The task pane is used by the user mainly referring to information temporarily or editing the document by using contents of the task pane, as described below. The extension application 702 started as the task pane does not exist in the document 701 and is used in collaboration with the document 701.

The term "existing in the document" means that an object existing in the document is printed in a case where a printer is instructed to print by the office application 301, for example. In other words, in the present exemplary embodiment, the task pane is not printed in a case where the printer is instructed to print by the office application 301.

The flow in which the extension application 702 edits document in collaboration with the document 701 will be described. Data setting areas 721 and 722 are provided by the web applications of the web application providing servers 102, 103, and 104. The extension application 702 sets these data and sends a request to the web application providing servers 102, 103, and 104 to acquire a graph 723 from the web applications. FIG. 7 illustrates an example in which document data 711 in the document 701 is set to a data setting area 721, document data 712 in the document 701 is set to a data setting area 722, and, as a result, the graph 723 is generated. FIG. 7 also illustrates a state where a graph 713 is inserted into the document 701 by receiving an instruction from the user to insert data of the graph 723 generated by the extension application 702 into the document 701.

A method for setting the document data 711 in the document 701 to the data setting area 721 and setting the document data 712 in the document 701 to the data setting area 722, will be described. For example, processing for associating the data setting area 721 with the document data 711 is described below. First, the data setting area 721 is brought into a selected state. Next, the document data 711 is selected. The office application 301 detects the selection and notifies it to the extension application 702 via the document collaboration 313. The notified extension application 702 acquires information about the document data 711 and sets the data to the data setting area 721 based on the notified contents.

In the present specification, data such as the graph 723 generated by the extension application is referred to as contents. The contents are results processed by the web application providing servers 102, 103, and 104. In the above description, the graph is cited as an example. However, a text, image, and moving image as well as a graph may be used. Alternatively, results searched by a search engine or results in which words are searched in a dictionary may be used.

A user of the office application 301 generates a document by a collaboration of the document 701 and the extension application 702 according to above-described editing flow.

The graph 713 may be updated in association when the data of the graph 723 generated by the extension application is updated on the web application providing servers 102, 103, and 104 (even if unconformity described below does not occur).

Figure 8:
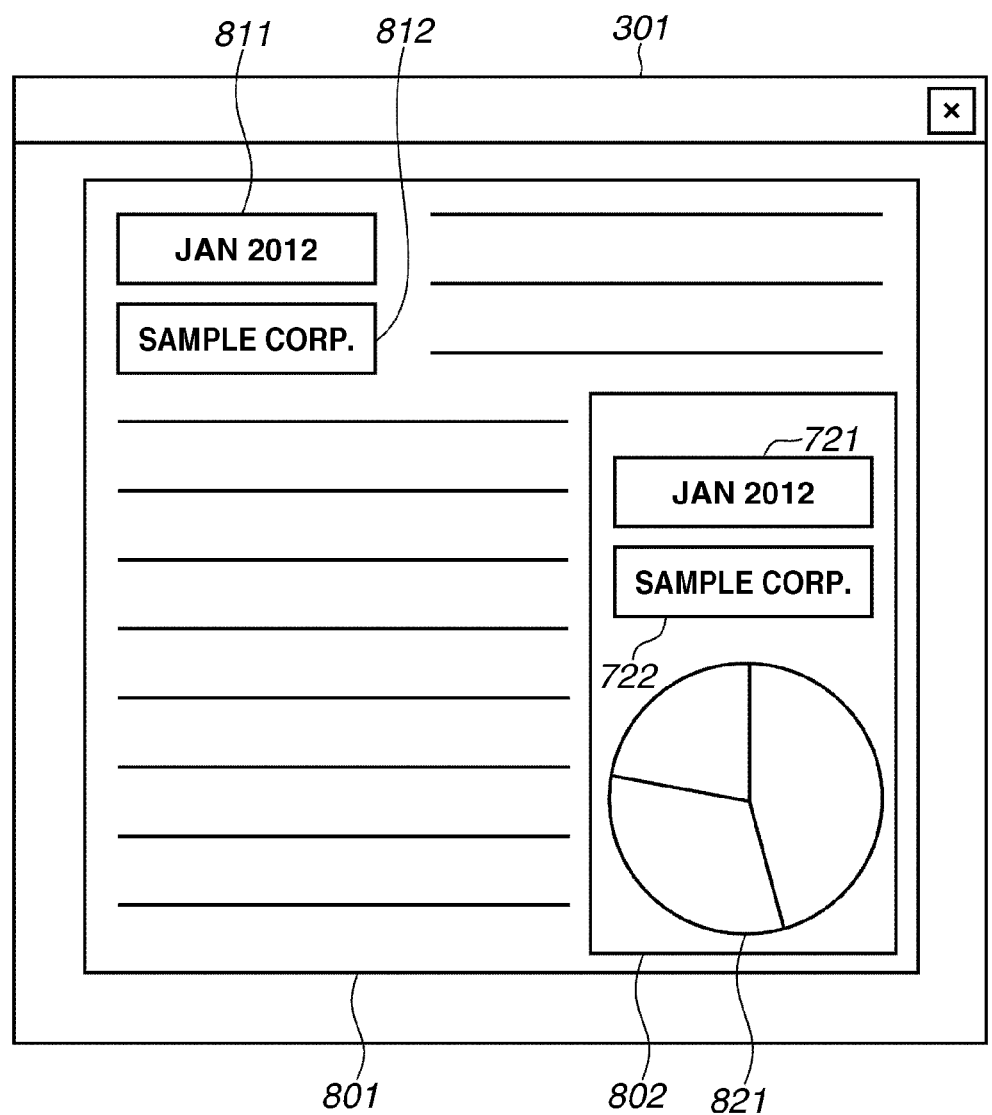
FIG. 8 illustrates an office application and an extension application according to another exemplary embodiment of the present invention.

FIG. 8 illustrates an example of the office application 301 and the extension application according to another exemplary embodiment of the present invention.

FIG. 8 illustrates a state where the office application 301 is started on the client terminal 106, and an extension application 802 is executed. A document 801 is document data opened by the office application 301. In the present exemplary embodiment, the extension application 802 is executed as an object embedded in the document 801. The extension application 802 started as an embedded object exists in the document 801 and is used in collaboration with the document 801. If the extension application 802 is embedded as an embedded object, the extension application 802 displays the data setting areas 721 and 722.

In the present specification, a method for starting the extension application as an embedded object is referred to as an embedded type.

A flow of editing a document of the document 801 collaborating with the extension application 802 is similar to that described in FIG. 7. If document data 811 and 812 of the document 801 are set to the extension application 802, the extension application 802 notifies it to the web application, and returns a screen on which a graph 821 is generated. In the embedded type, the generated graph is not embedded again as an image, but the display result by the extension application is embedded in the document.

The office application 301 may have a function to display only graph 821, not the data setting areas 721 and 722 inside the extension application 802, by the user trimming the extension application 802.

The outline of the flow of the document editing using the extension application is described above.

Editing information record of the extension application is described below with reference to FIGS. 9 and 10. In the processing, editing information is recorded according to operation contents in the extension application. The recorded editing information is used for performing various processing operations such as updating the state of the extension application when the document is opened next time.

Figure 9:
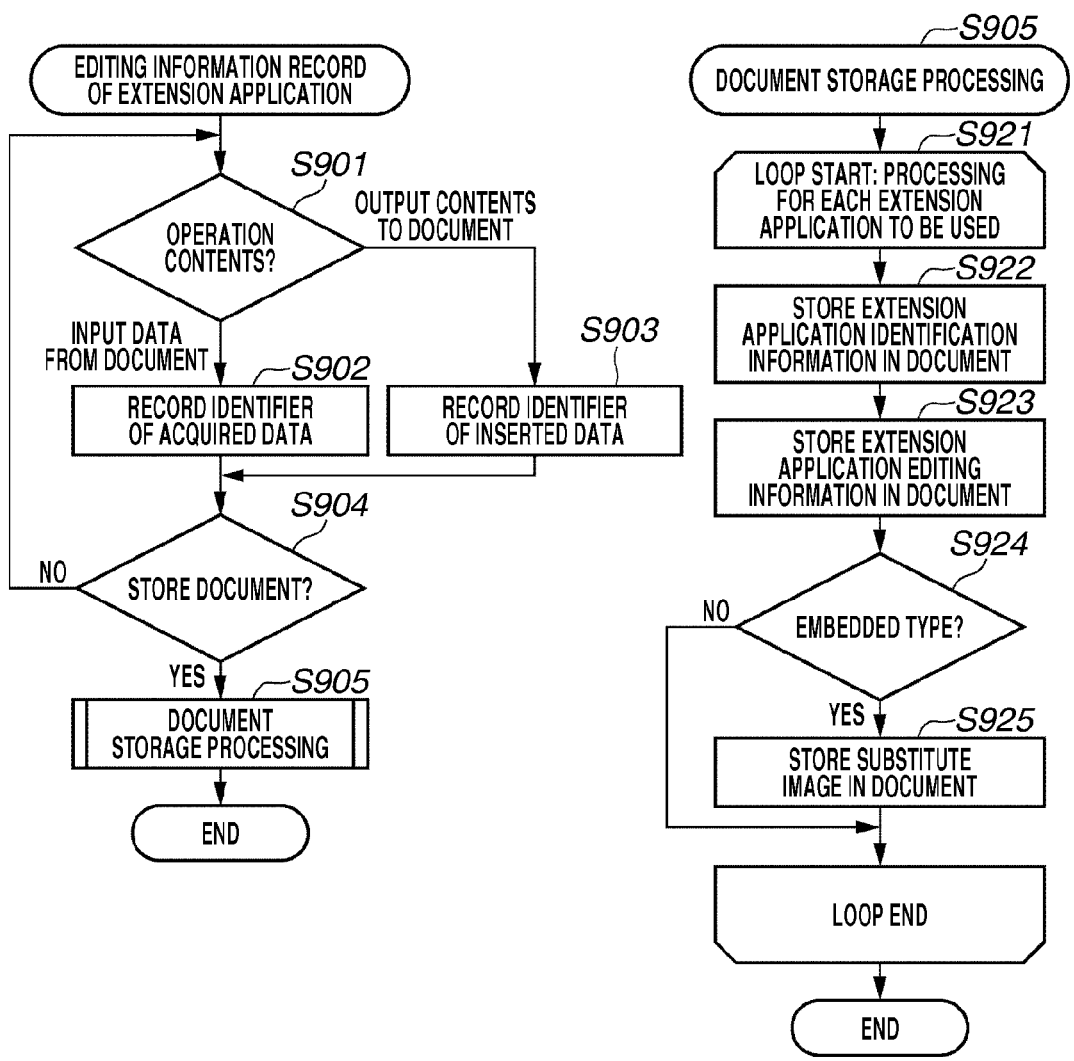
FIG. 9 is a flowchart illustrating a flow of an extension application editing information record processing performed by the office application.

FIG. 9 is a flowchart illustrating a flow of extension application editing information record processing performed by the office application 301 according to the present exemplary embodiment. The processing in FIG. 9 is executed at a time of operating the document or inserting contents in the extension application into the contents.

FIG. 10 is an example of information related to the extension application, actually recorded by the processing in FIG. 9. Editing information 1001 of the extension application in FIG. 10 includes identification information 1002, editing information 1003, the editing information 1004, and the editing information 1005, and substitute image information 1006.

The editing information 1001 of the extension application can be recorded in the following places:
1) A meta data area where information excluding main body of a document such as bibliographic information in the document is recorded at the time of storing the document;
2) A specific area of a local disk associated with a document;
3) The web application providing servers 102, 103, and 104 (FIG. 3A) providing the extension application; and
4) The web application providing servers 102, 103, and 104 (FIG. 3B) providing the office application 301.
In the present exemplary embodiment, description is made on the assumption that the editing information 1001 is recorded in the meta data area in the document.

In step S901, the office application 301 determines what operational content of document editing using the extension application is. If the office application 301 determines that the extension application captures document data, the processing proceeds to step S902.

In step S902, the office application 301 records an identifier that uniquely identifies the data acquired from the document in the document and an identifier that uniquely identifies a capturing destination in the extension application.

The editing information 1003 and the editing information 1004 are examples of data to be captured in the document. The editing information 1003 indicates that data of "ObjectA" on the document is input to "Input1" of the extension application. Similarly, the editing information 1004 indicates that data of "ObjectB" on the document is input to "Input2" of the extension application.

For example, if FIG. 7 is cited as an example, "ObjectA," "ObjectB," "Input1," and "Input2" correspond to the document data 711, the document data 712, the data setting area 721, and the data setting area 722, respectively. "OK" written in the editing information 1003 to the editing information 1005 indicates status and is described below.

In step S901, if the office application 301 determines that data of the extension application is inserted to the document, the processing proceeds to step S903. In step S903, the office application 301 records an identifier that uniquely identifies the data inserted to the document in the document and an identifier that uniquely identifies the data output from the extension application. The editing information 1005 is an example thereof. The editing information 1005 indicates that data of "Output1" of the extension application is output to "ObjectC" on the document.

For example, if FIG. 7 is cited as an example, "Output1" and "ObjectC" correspond to the graph 723 and the graph 713, respectively.

In step S904, the office application 301 determines whether a document is stored. The office application 301 determines that the document is stored if a document storage button is pressed or a selection for storage at the time of closing the document is performed, for example. If the document is not stored (NO in step S904), the processing returns to step S901 and the office application 301 determines what operational content is. If the document is stored (YES in step S904), the processing proceeds to document storage processing in step S905.

In step S921, the office application 301 repeats processing for each extension application used in the present document. If a document is edited using the plurality of extension applications, the editing information 1001 of the extension application is stored for each the extension application.

In step S922, the identification information 1002 of the extension application in FIG. 10 is stored in the meta data area in the document using the definition information 1301. The identifier of the identification information 1002 is the same value as that defined by the extension application ID column 501 in FIG. 5.

In step 923, the editing information 1001 of the extension application is stored in the meta data area in the document. As described above, the editing information 1001 of the extension application includes editing information 1003, the editing information 1004, and the editing information 1005 recorded in steps S902 and S903.

In steps S924 and S925, processing related to a substitute image is performed. A reason the substitute image is stored is described before the processing in each step is described in detail. In the processing in FIG. 9, an example in which the extension application is available is described, however, the office application cannot use (does not use) the extension application depending on the situation, as described below. In the environment where the extension application does not exist, it is understood that the screen of the extension application embedded in the document data cannot be browsed.

Therefore, in the present specification, the screen displaying in the environment where the extension application exists is stored as an image. Thereby, an substitute image is displayed instead of the screen provided by the extension application even in the environment where the extension application does not exist, allowing browsing contents provided by the extension application in the document even in the environment where the extension application does not exist.

In step S924, the office application 301 checks if the extension application is of an embedded type. If the extension application is of the embedded type (YES in step S924), the office application 301 performs the processing in step S925. If the extension application is of a task pane type (NO in step S924), the office application 301 ends the processing without performing the processing in step S925.

More specifically, in step S925, the screen currently displayed by the embedded extension application is stored in the meta data area in the document as the substitute image information 1006. This is described in detail with reference to FIG. 10. A position where the substitute image is displayed in the document is designated with a <Position> tag. In this example, a page position in the document, and the X and Y coordinates in the page are recorded. A <Data> tag is actual image data and indicates an example in which the encoded binary data of an image format (portable network graphics (PNG) format, for example) is stored.

The image data can be stored not only in the meta data area in the document, but on a local disk or on the web application providing servers 102, 103, and 104 as a file or data. In such a configuration, a file position (a file path or URL) is input to a <Data> tag.

In the method for storing image data in a specific area of the local disk associated with the document in another exemplary embodiment described above, information (a file path, for example) for uniquely identifying the specific area of the local disk is recorded in the meta data area in the document. Furthermore, the editing information 1001 of the extension application is stored in the local disk.

In the method for storing the image data on the web application providing servers 102, 103, and 104, the URL uniquely identifying a storage destination is stored in the meta data area in the document. Furthermore, the editing information 1001 of the extension application is stored on the web application providing servers 102, 103, and 104.

Figure 14:
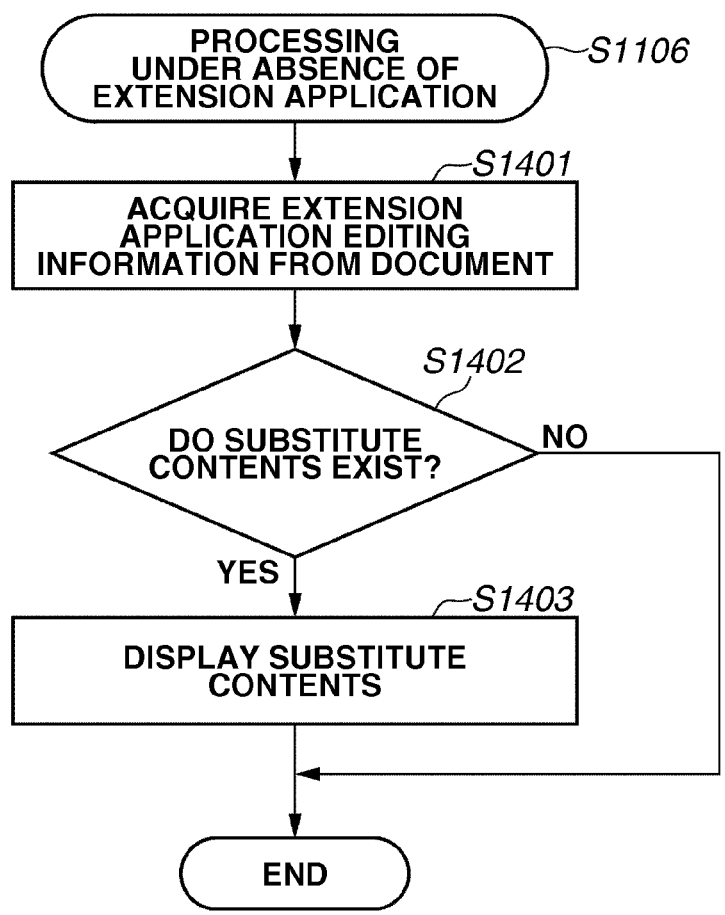
FIG. 14 is a flowchart illustrating a flow of document display processing of the office application in a case where the extension application does not exist.

The processing for displaying the substitute image stored in step S925 in the environment where the extension application does not exist is described below with reference to FIG. 14.

In the processing in FIG. 9, only the embedded extension application is stored as the substitute image, however, in a case of the task-pane extension application, the substitute image maybe stored.

Through the above processing, the editing information 1001 of the extension application at the time of editing the document is stored in the document.

A flow of displaying the document by the office application 301 opening the document storing the editing information 1001 of the extension application, will be described.

Figure 11:
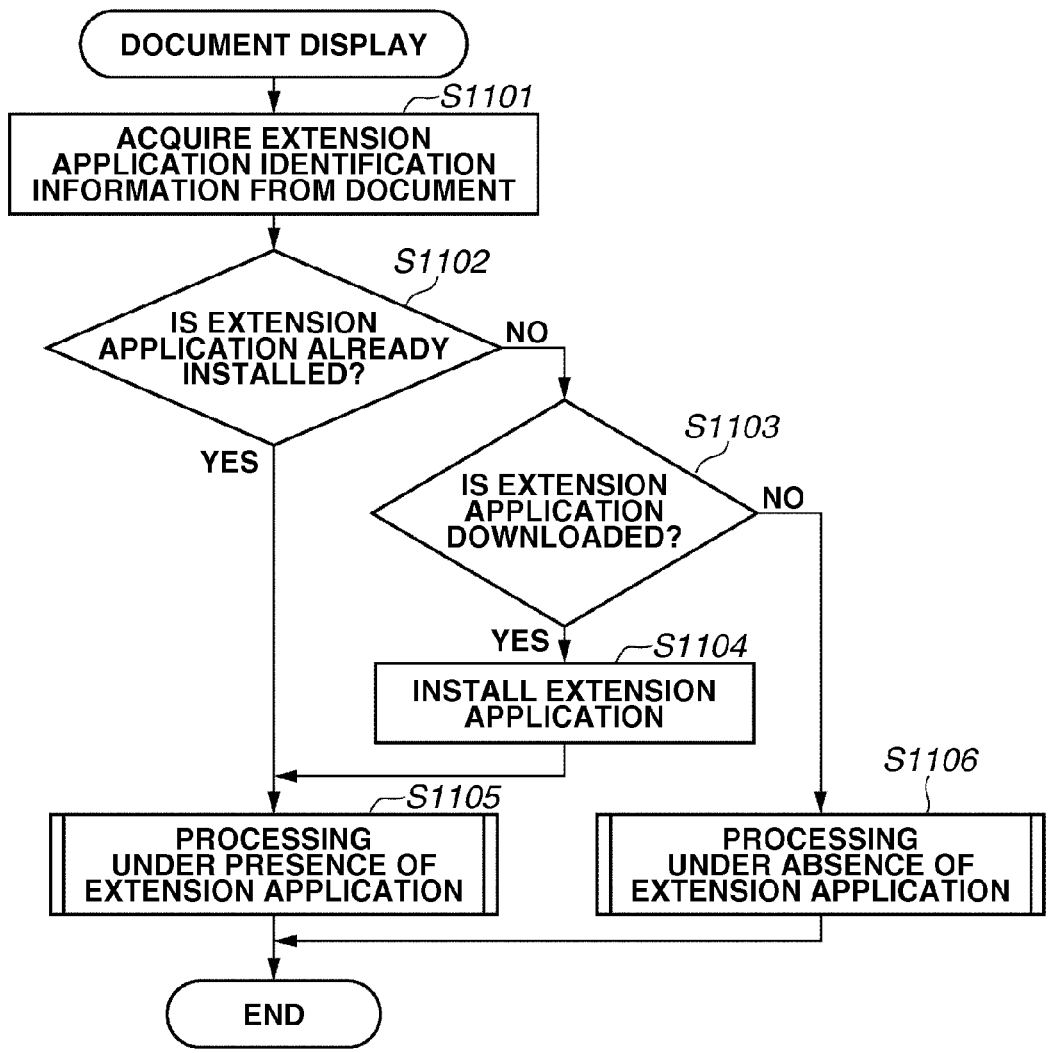
FIG. 11 is a flowchart illustrating a flow of processing performed when the office application opens a document with the extension application editing information.

FIG. 11 is a flowchart illustrating a flow of processing performed when the office application 301 opens the document storing the editing information 1001 of the extension application according to the present exemplary embodiment. If there is a plurality of pieces of the editing information 1001 of the extension application stored in the document, the processing is repeated by the number thereof.

If the client terminal is configured as illustrated in FIG. 3A, a flow in a case where the document file is opened at the same client terminal as the client terminal executing the processing in FIG. 9 is similar to a flow in a case where the document file is opened at the client terminal different from the client terminal executing the processing in FIG. 9.

Also in a case where the document shared with the web application is opened at the client terminal in the office application 301 provided by the web application, the processing is performed based on the flow illustrated in FIG. 11.

If the office application 301 opens the document storing the editing information 1001 of the extension application, the office application 301 performs the processing in step S1101. In step S1101, the office application 301 acquires the identification information 1002 of the extension application from the meta data area of the document.

In step S1102, the expansion application management function 312 determines whether the extension application with the identifier of the identification information 1002 of the extension application acquired in step S1101 is installed in the environment of the office application 301. If the extension application is not installed (NO in step S1102), the processing proceeds to step S1103.

Figure 12:
FIG. 12 is an example of a download confirmation screen displayed by the office application.

In step S1103, it is confirmed whether the user downloads the extension application through a confirmation screen. An example of a download confirmation screen displayed by the office application 301 is illustrated in FIG. 12.

The office application 301 requests the extension application search unit 412 of the extension application distribution server 101 to perform search using the extension application ID to display a download confirmation screen 1201. The extension application search unit 412 searches the extension application management DB 402 using the extension application ID and sends various pieces of information 502, 504, and 505 of the corresponding extension application as a response. The office application 301 uses the various pieces of information 502, 504, and 505 to generate the download confirmation screen 1201.

When the user presses a "Yes" button 1202 on the download confirmation screen 1201, the office application 301 determines that the extension application is downloaded (YES in step S1103), and the processing proceeds to step S1104. When the user presses a "No" button 1203 thereon, the office application 301 determines that the extension application is not downloaded (NO in step S1103), and the processing proceeds to step S1106. A detailed processing in step S1106 is described below.

In step S1104, the extension application is installed. The office application 301 requests the extension application download unit 413 of the extension application distribution server 101 to perform download using the extension application ID. The extension application download unit 413 searches the extension application management DB 402 using the extension application ID, generates definition information described below from the data of the corresponding extension application, and sends the definition information as a response. The office application 301 stores the downloaded definition information in the expansion application management function 312 and ends the installation of the extension application.

In step S1105, document display processing is performed in the environment where the extension application exists. The step S1105 is described below.

The document display processing performed in the environment where the extension application does not exist and performed in the above step S1106, will be described. FIG. 14 is a flowchart illustrating a flow of the processing performed in step S1106.

In step S1401, the office application 301 acquires the editing information 1001 of the extension application from the meta data area of the document. In step S1402, the office application 301 checks if a substitute image exists in the editing information 1001 of the extension application. If the substitute image exists, in other words, the embedded extension application is used (YES in step S1402), in step S1403, the substitute image is displayed in the extension application area in the document data.

With this operation, an image is displayed instead of the screen provided by the extension application even in the environment where the extension application does not exist, allowing browsing contents provided by the extension application even in the environment where the extension application does not exist.

The operation of document editing in the environment where the extension application does not exist in step S1106 is described below.

Figure 15:
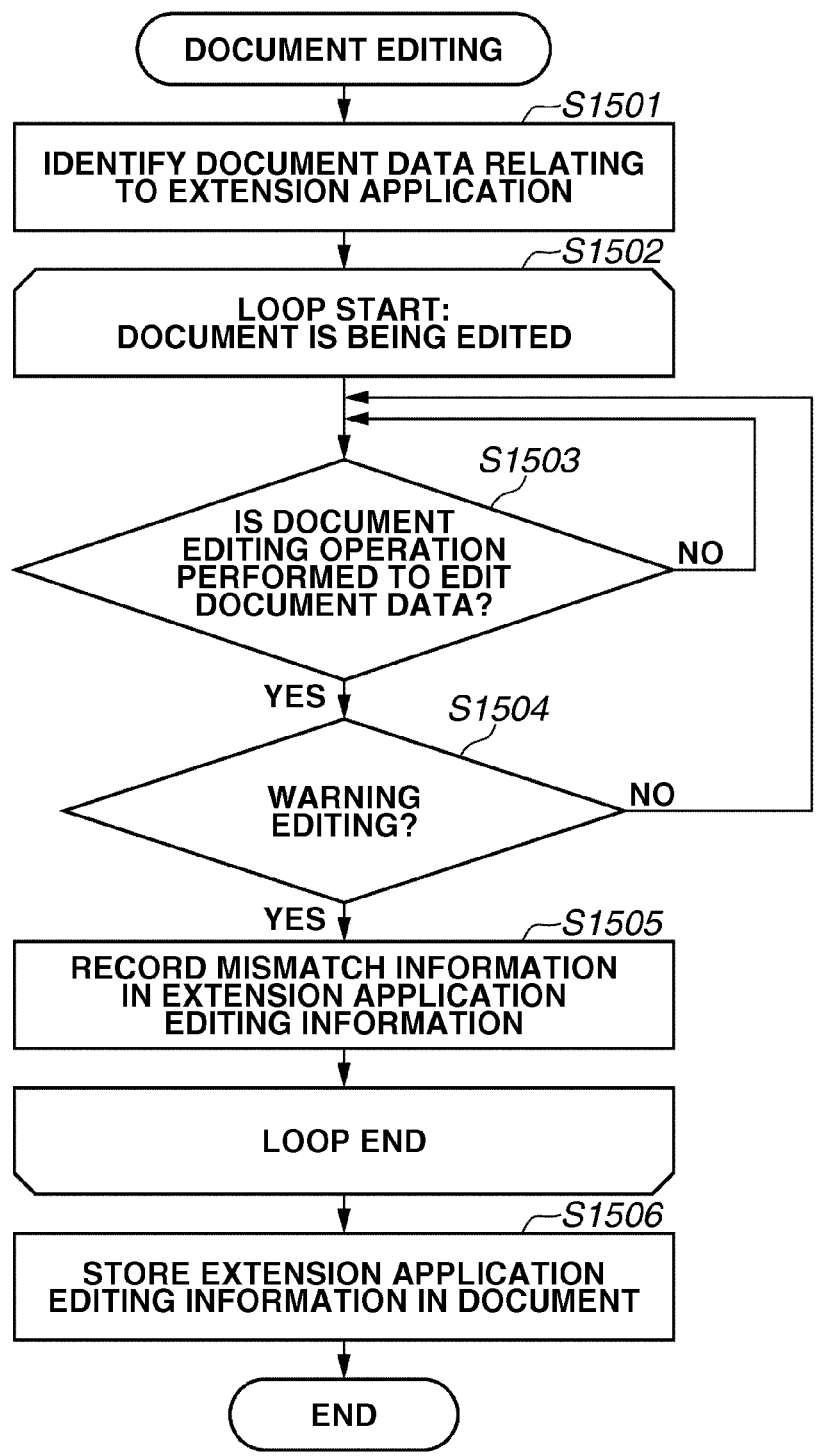
FIG. 15 is a flowchart illustrating a flow of document editing processing of the office application in a case where the extension application does not exist.

FIG. 15 illustrates processing for editing a document with the editing information 1001 of the extension application in a case where the extension application does not exist in the office application 301, according to the exemplary embodiment of the present invention. In step S1501, the office application 301 acquires the editing information 1001 of the extension application from the meta data area of the document. The office application 301 identifies the object relating to the extension application from the acquired editing information.

The object (input/output object) relating to the extension application refers to an object in the document data used in the extension application such as the document data 711 and the document data 712 illustrated in FIG. 7, and an object in the document data output by the extension application such as the graph 713. Referring to FIG. 10, "ObjectA" of the editing information 1003, "ObjectB" of the editing information 1004, and "ObjectC" of the editing information 1005 correspond to objects related to the extension application.

In step S1502, the loop processing is performed while the document is being edited. The loop processing is ended at the time of storing the document.

Figure 16:
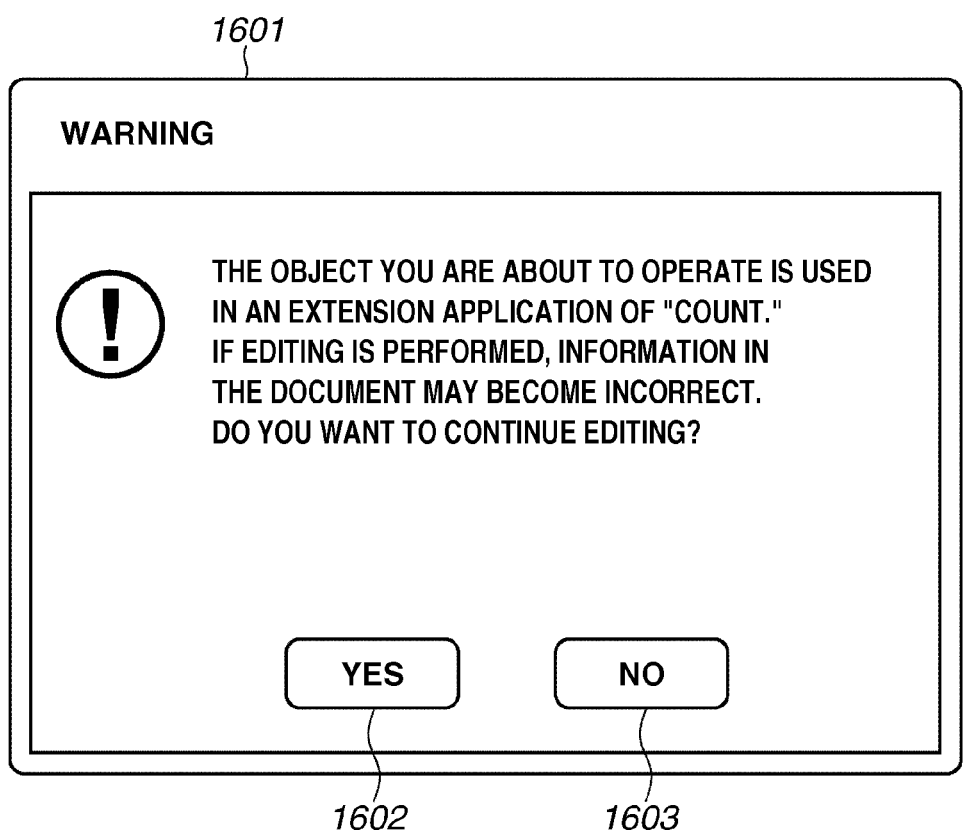
FIG. 16 is an example screen for warning editing of an object related to the extension application.

In step S1503, the office application 301 checks if a document editing operation in the office application 301 is performed to edit the document data identified in step S1501. If the document editing operation is not performed to edit the identified document data (NO in step S1503), in step S1503, the next document editing operation is checked. If the document editing operation is performed to edit the identified document data (YES in step S1503), in step S1504, a warning display is performed. An example of the warning screen is illustrated in FIG. 16.

In step S1504, the office application 301 determines whether the document data identified by the user in step S1501 is edited. If the user presses a "Yes" button 1602 in the warning screen, the office application 301 determines that the document data is edited (YES in step S1504), the processing proceeds to step S1505. If the user presses a "No" button 1603, the office application 301 determines that the document data is not edited (NO in step S1504), the processing is returned to step S1503.

In step S1505, the office application 301 records document mismatch information in extension application editing information. A method for recording the mismatch information for each operation using an example of the editing information illustrated in FIGS. 17A, 17B, 17C, and 17D, will be described below.

FIGS. 17A, 17B, 17C, and 17D illustrate four patterns in which influence is estimated according to what is edited, and recorded.

FIG. 17A illustrates an example of recording the document mismatch information on the assumption that the document data output by the extension application is also affected if the document data used in the extension application is edited. More specifically, FIGS. 17A, 17B, 17C, and 17D illustrate an example of editing "ObjectB" of the document in which data is input to "Input2" of the extension application. Data 1702 is set to "Edit" to denote editing. As a result of editing, data input to the extension application is changed, so that the data output from the extension application may have caused mismatch. For this reason, the result of inserting the data of "Output1" of the extension application into "ObjectC" of the document is determined as a mismatch state. Data 1703 indicate a mismatch state which can be updated as "Warning."

FIG. 17B illustrates an example of recording the document mismatch information on the assumption that the extension application cannot output again the document data if the document data used in the extension application is deleted. More specifically, FIG. 17B illustrates an example of deleting "ObjectB" of the document in which data is input to "Input2" of the extension application. Data 1712 is set to "Deletion" to indicate deletion. As a result of deletion, data input to the extension application is changed, so that data may not be able to be re-generated from the present document by the extension application. For this reason, the result of inserting the data of "Output1" of the extension application into "ObjectC" of the document is determined as a mismatch state. Data 1713 indicate a mismatch state which cannot be updated as "Error."

FIG. 17C illustrates an example of recording the document mismatch information on the assumption that the document data input to the extension application and the document data output by the extension application are mismatched if the document data output by the extension application is edited. More specifically, FIG. 17C illustrates an example of editing "ObjectC" of the document inserted from "Output1" of the extension application. Data 1723 is set to "Edit" to denote editing. As a result of editing, data inserted to the document from the extension application is modified, so that it is determined that the data input to the extension application from the document and the data inserted to the document from the extension application are in a mismatch state. Data 1721 and 1722 indicate a mismatch state which can be updated as "Warning."

FIG. 17D illustrates an example of recording the document mismatch information on the assumption that the document data input to the extension application may become unnecessary if the document data output by the extension application is deleted. More specifically, FIG. 17D illustrates an example of deleting "ObjectC" of the document inserted from "Output1" of the extension application. Data 1733 is set to "Delete" to indicate deletion. As a result of deletion, the input document data may not be necessary any more in the extension application, so that it is determined that the data input to the extension application from the document is in a mismatch state. Data 1731 and 1732 indicate a mismatch state which cannot be updated as "Error."

As described above, when all of the document editing operations are ended and the document is stored, the processing proceeds to step S1506. In step S1506, the extension application editing information is stored in the meta data area of the document.

The document editing processing in the environment where the extension application does not exist, has been described above.

The description returns to the document display processing in step S1105 illustrated in FIG. 11 performed in the environment where the extension application exists.

Figure 18:
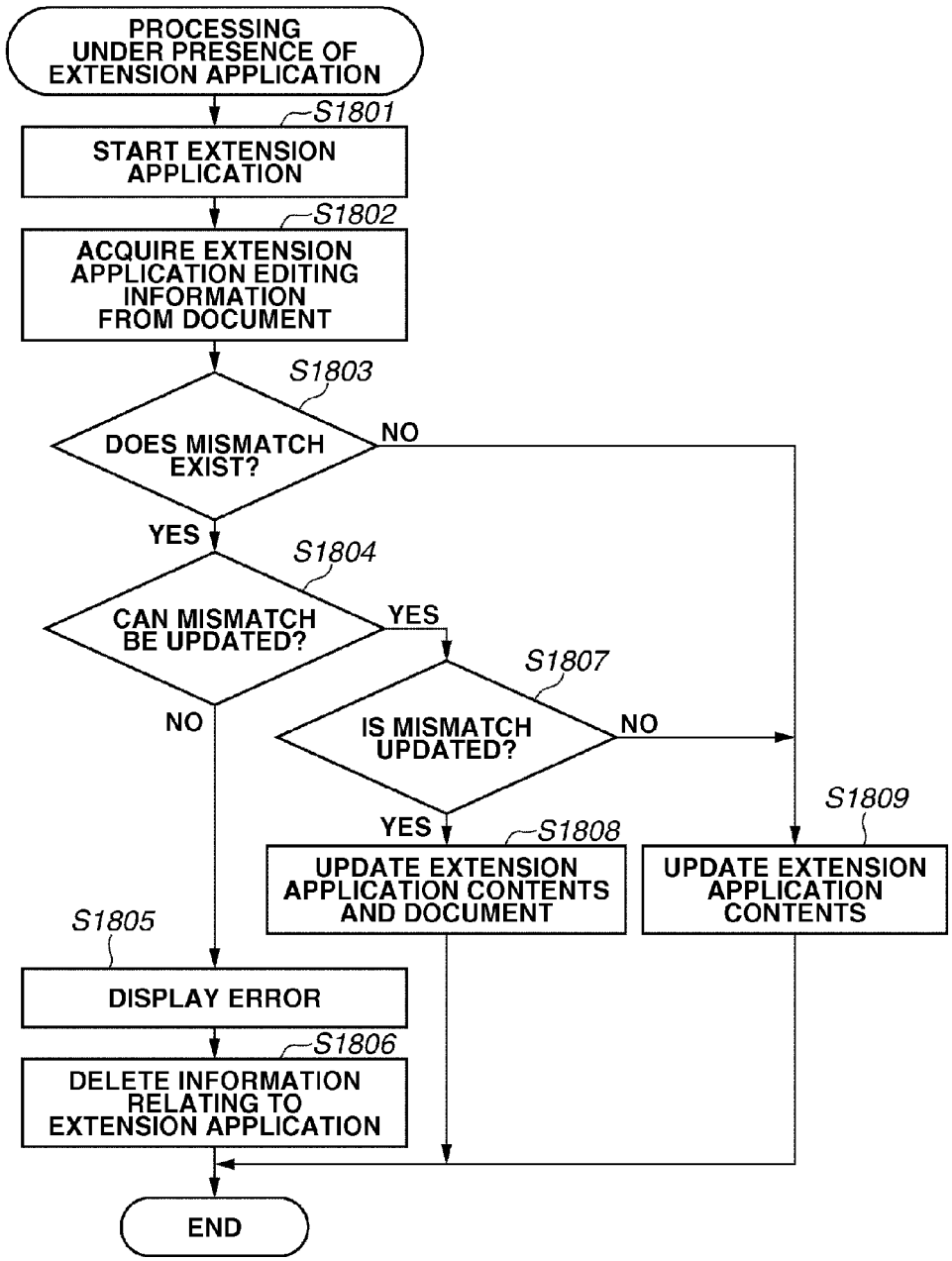
FIG. 18 is a flowchart illustrating a flow of document display processing of the office application in a case where the extension application exists.

FIG. 18 is a flowchart illustrating a flow of processing performed in step S1105. In step S1801, the office application 301 starts the extension application installed therein based on the identification information of the extension application acquired in step S1101. When the extension application is started, the extension application opens the URL of the set location.

In step S1802, the office application 301 acquires the extension application editing information from the meta data area of the document.

In step S1803, the office application 301 checks if mismatch information illustrated in FIGS. 17A, 17B, 17C, and 17D exists in the acquired editing information. If the mismatch information does not exist (NO in step S1803), in step S1809, the office application 301 updates the contents of the extension application. An example in a case where the extension application has the editing information of 1003, the editing information 1004, and the editing information 1005 in FIG. 10 is described. The office application 301 inputs the value of "ObjectA" of the document data to "Input1" of the extension application and the value of "ObjectB" thereof to "Input2" of the extension application. Furthermore, the office application 301 inserts the data of "Output1" generated by the extension application into "ObjectC" of the document data to perform update. This processing brings the document into a state similar to an editing state.

If it is determined that the mismatch information exists (YES in step S1803), the processing proceeds to step S1804.

In step S1804, the office application 301 checks if the mismatch information can be updated. If the editing information cannot be updated, as illustrated in FIGS. 17B and 17D, (NO in step S1804), the processing proceeds to step S1805. If the editing information can be updated, as illustrated in FIGS. 17A and, 17C (YES in step S1804), the processing proceeds to step S1807.

Figure 19:
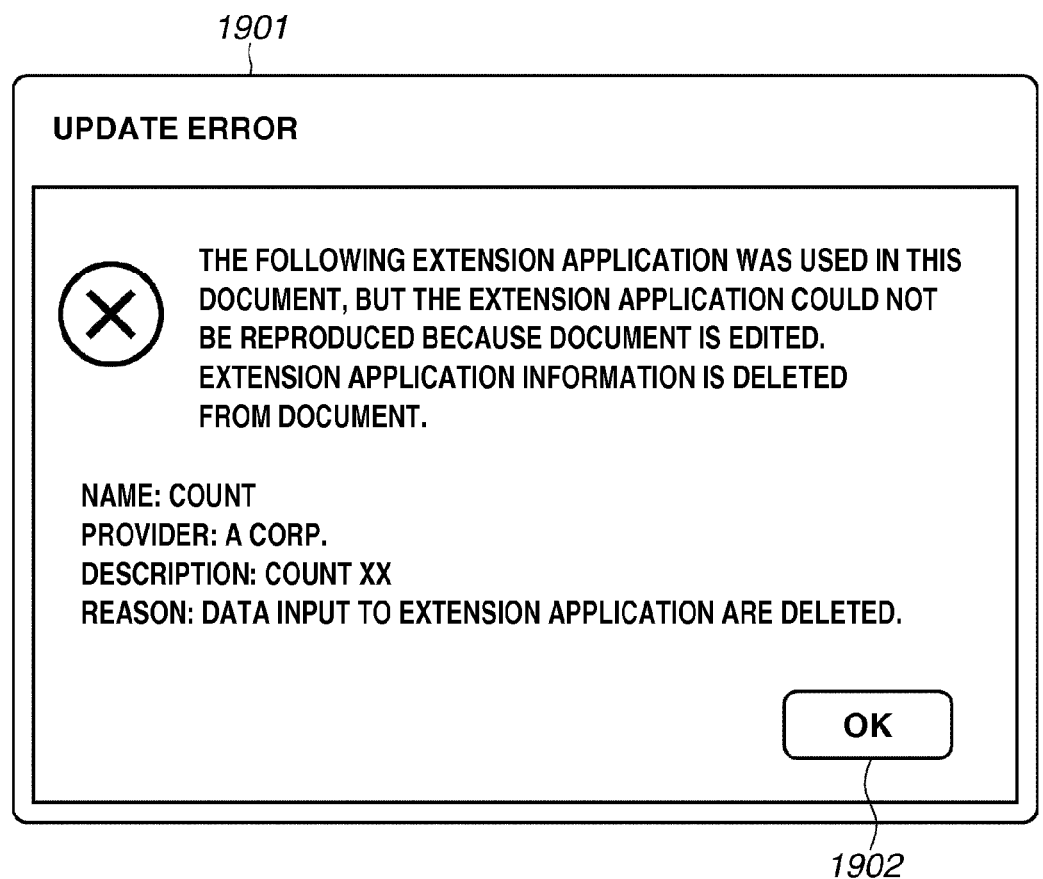
FIG. 19 illustrates an example error screen in a case where a mismatch state which cannot be updated is recorded in the extension application editing information.

In step S1805, an error is displayed in a case where the mismatch cannot be updated. FIG. 19 illustrates an example of the displayed error screen. The example indicates an error massage in a state illustrated in FIG. 17B. An update error screen 1901 displays not only an error message, but also information about the corresponding extension application and reasons based on the editing information. If an OK button 1902 is pressed, the processing proceeds to step S1806.

In step S1806, the editing information 1001 (the identification information 1002, the editing information 103, the editing information 1004, the editing information 1005, and the substitute image information 1006) of the extension application is deleted from the meta data area of the document.

Figure 20:
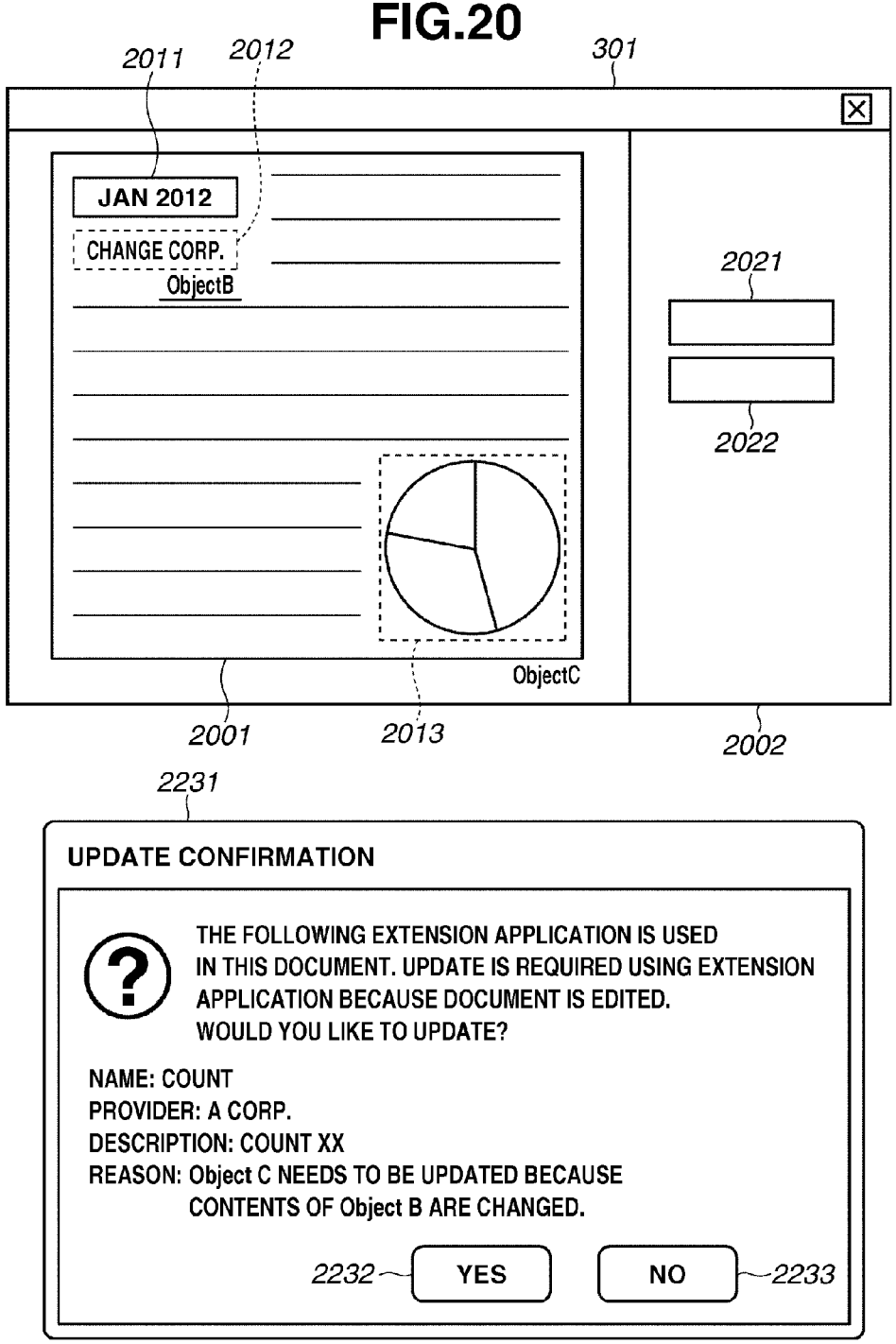
FIG. 20 illustrates an example office application and confirmation screen in a case where a mismatch state which can be updated is recorded in the extension application editing information.

In step S1807, the office application 301 displays an update confirmation screen to determine whether to update the mismatch information. FIG. 20 illustrates an example of a state of the office application 301 and the update confirmation screen in a case where the update confirmation screen is displayed. In the present exemplary embodiment, an example of the update confirmation screen in a case where the document illustrated in FIG. 7 is edited in a state is illustrated in FIG. 17A.

The office application 301 opens a document to display the document 2001. The document 2001 is the one that an "ObjectB" 2012 is edited from the document 701. Until the processing in step S1807, an extension application 2002 is also started to display an initial screen. Following the above processing, display processing of an update confirmation screen 2231 is performed to display the update confirmation screen 2231. When the update confirmation screen 2231 is displayed, "ObjectB" 2012 and "ObjectC" 2013 of the target document data are specified in the document 2001.

If a "Yes" button 2232 is pressed in the screen, the office application 301 determines that the mismatch information is updated (YES in step S1807), and the processing proceeds to step S1808. If a "No" button 2233 is pressed in the screen, the office application 301 determines that the mismatch information is not updated (NO in step S1807), and the processing proceeds to step S1809.

Figure 21:
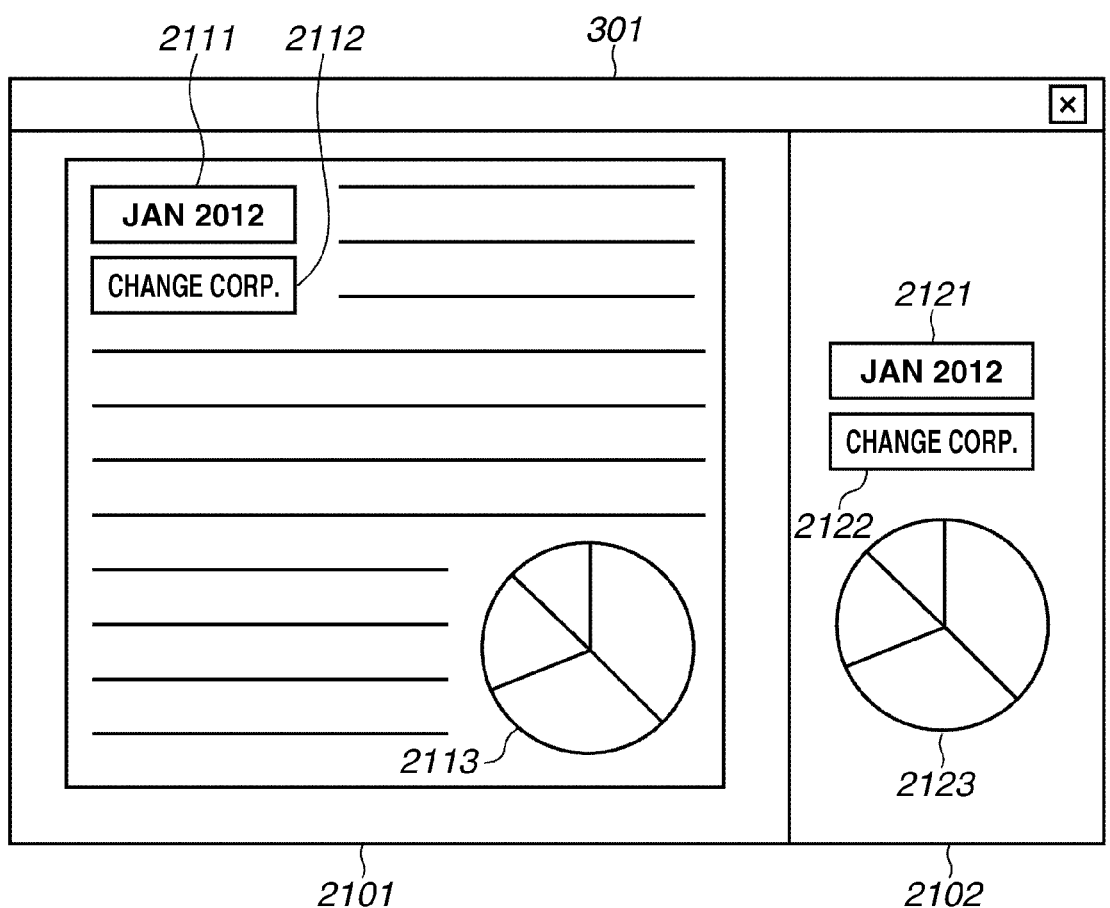
FIG. 21 illustrates an example office application screen in a case where the extension application and the document are updated by the extension application editing information.

In step S1808, contents of the extension application and the document are both updated. FIG. 21 illustrates a screen in a case where the processing in step S1808 is ended. The office application 301 inputs the document data 2111 and 2112 to areas 2121 and 2122 respectively to update the contents of the extension application 2102. The extension application 2102 transmits a request to the web application providing servers 102, 103, and 104 based on the data to generate the contents 2123. Furthermore, the office application 301 outputs the contents 2123 to an area 2113. The above processing replaces the graph 2013 based on old data with the new graph 2113 to update a document 2101 and the extension application 2102 as well.

In step S1809, only the contents of the extension application are updated.

Figure 22:
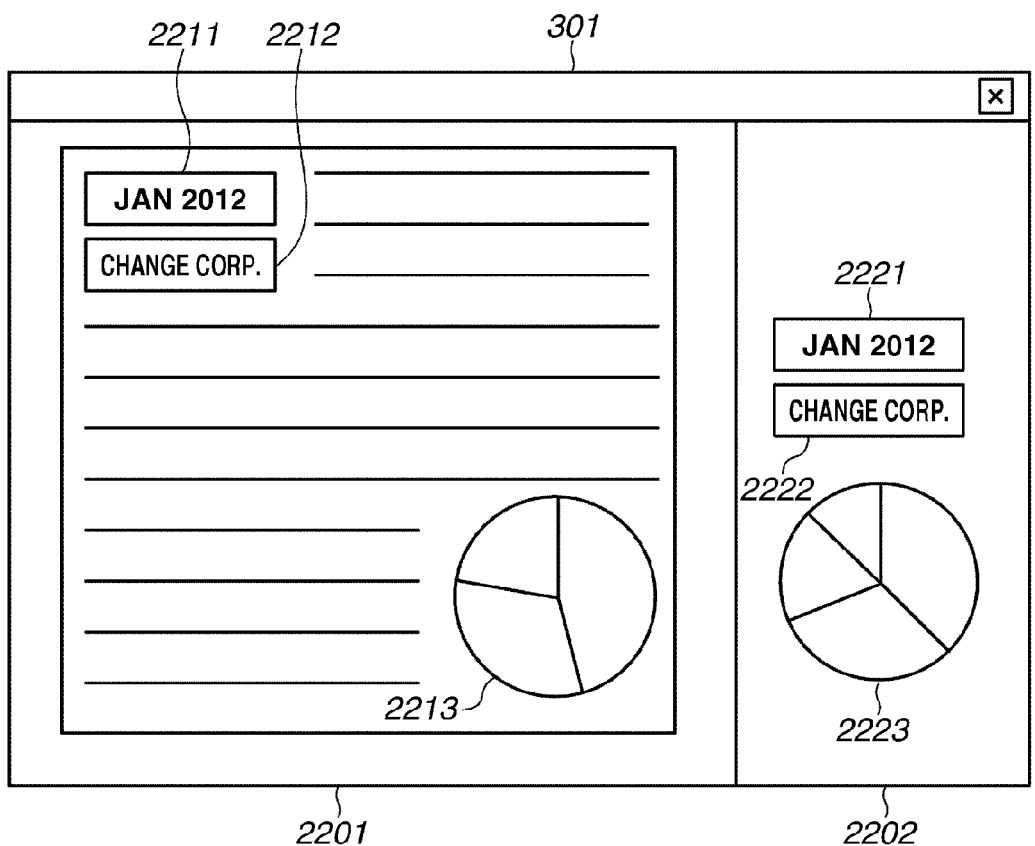
FIG. 22 illustrates an example office application screen in a case where the extension application is updated by the extension application editing information.

FIG. 22 illustrates an example screen displayed after the office application 301 determines that the mismatch information is not updated in step S1807, and then the processing is ended in step S1809. The office application 301 inputs the document data 2211 and 2212 to areas 2221 and 2222 respectively to update the contents of the extension application 2202. The extension application 2202 transmits a request to the web application providing servers 102, 103, and 104 based on the data to generate the contents 2223. Unlike the processing in step S1808, in the processing in step S1809, the graph 2213 based on old data is not replaced with the new graph 2223. With the above-described processing, the extension application 2202 is updated to the latest state.

If the office application 301 determines that the mismatch information does not exist (NO in step S1803) and the processing in step S1809 is performed, editing is not performed in the environment where the extension application does not exist, the screen illustrated in FIG. 7, for example, is displayed.

The present invention is also realized by executing the following processing.

The processing is such that a software program realizing the functions of the above exemplary embodiments is supplied to a system or an apparatus via a network or various recording media and a computer (or a CPU or MPU) of the system or the apparatus reads and executes the program.

According to the present invention, document data can be updated in collaboration with an external information processing apparatus by determining whether an object in the document data is edited.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-199484 filed Sep. 11, 2012, which is hereby incorporated by reference herein in its entirety.

What is claimed is:

1. An information processing apparatus comprising:
an input unit configured to input, as editing information, an input object in document data to an extension application from an editing application for editing a document, the extension application being executed as an object embedded in the document;
a transmission unit configured to transmit the inputted editing information to an external information processing apparatus;

a reception unit configured to receive content that is a result of processing performed by the external information processing apparatus based on the transmitted editing information;

an update unit configured to, in a case where the editing application keeps the document open and the extension application is being executed, update the document data by displaying the content received by the reception unit on a display area of the extension application;

a storage unit configured to store, in a case where the editing application keeps the document open and the input object in the document data is edited without the extension application being executed, information indicating that the input object is edited; and a display unit configured to display a screen for selecting whether to update the display area of the extension application in a case where the editing application keeps the document open, the extension application is being executed, and the information indicating that the input object is edited is stored in the storage unit.

2. The information processing apparatus according to claim 1, further comprising:
a determination unit configured to determine, if it is determined that the editing information is stored, whether the extension application can update the document data from the editing information; and
a deletion unit configured to, if the determination unit determines that the extension application cannot update the document data, delete information about the extension application from the document data.

3. The information processing apparatus according to claim 1, further comprising an installing unit configured to, if the extension application is not yet installed, prompt a user to install the extension application.

4. The information processing apparatus according to claim 1, further comprising a management unit configured to display a list of information about the extension application, search the extension application and download information about the extension application.

5. The information processing apparatus according to claim 1, further comprising a warning unit configured to warn a user if the extension application is not executed and the input object is edited.

6. The information processing apparatus according to claim 1, further comprising a deletion unit configured to, if the extension application is executed and the editing information has mismatch information, delete information about the extension application.

7. A control method comprising:
inputting, as editing information, an input object in document data to an extension application from an editing application for editing a document, the extension application being executed as an object embedded in the document;
transmitting the inputted editing information to an external information processing apparatus;
receiving content that is a result of processing performed by the external information processing apparatus based on the transmitted editing information;
in a case where the editing application keeps the document open and the extension application is being executed, updating the document data by displaying the received content on a display area of the extension application;
in a case where the editing application keeps the document open and the input object in the document data is edited without the extension application being executed, storing information indicating that the input object is edited; and
displaying a screen for selecting whether to update the display area of the extension application in a case where the editing application keeps the document open, the extension application is being executed, and the information indicating that the input object is edited is stored.

8. The control method according to claim 7, further comprising:
if it is determined that the editing information is stored, determining whether the extension application can update the document data from the editing information; and
if it is determined that the extension application cannot update the document data, deleting information about the extension application from the document data.

9. The control method according to claim 7, further comprising, if the extension application is not yet installed, prompting a user to install the extension application.

10. The control method according to claim 7, further comprising displaying a list managing information about the extension application, searching the extension application and downloading information about the extension application.

11. The control method according to claim 7, further comprising warning a user if the extension application is not executed and the input object is edited.

12. The control method according to claim 7, further comprising, if the extension application is executed and the editing information has mismatch information, deleting information about the extension application.

13. A non-transitory recording medium storing a program comprising executable instructions that, when executed, cause a computer to execute operations comprising:
inputting, as editing information, an input object in document data to an extension application from an editing application for editing a document, the extension application being executed as an object embedded in the document;
transmitting the inputted editing information to an external information processing apparatus;
receiving content that is a result of processing performed by the external information processing apparatus based on the transmitted editing information;
in a case where the editing application keeps the document open and the extension application is being executed, updating the document data by displaying the received content on a display area of the extension application;
in a case where the editing application keeps the document open and the input object in the document data is edited without the extension application being executed, storing information indicating that the input object is edited; and
displaying a screen for selecting whether to update the display area of the extension application in a case where the editing application keeps the document open, the extension application is being executed, and the information indicating that the input object is edited is stored.

* * * * *